United States Patent
Greetham (10) Patent No.: US 12,431,804 B2
(45) Date of Patent: Sep. 30, 2025

(54) AC-DC BUCK-BOOST CONVERTER

(71) Applicant: Dyson Technology Limited, Wiltshire (GB)

(72) Inventor: Stephen Greetham, Gloucester (GB)

(73) Assignee: Dyson Technology Limited, Malmesbury (GB)

( * ) Notice: Subject to any disclaimer, the term of this patent is extended or adjusted under 35 U.S.C. 154(b) by 222 days.

(21) Appl. No.: 18/038,188

(22) PCT Filed: Nov. 15, 2021

(86) PCT No.: PCT/GB2021/052953
§ 371 (c)(1),
(2) Date: May 22, 2023

(87) PCT Pub. No.: WO2022/123203
PCT Pub. Date: Jun. 16, 2022

(65) Prior Publication Data
US 2024/0006997 A1 Jan. 4, 2024

(30) Foreign Application Priority Data

Dec. 8, 2020 (GB) .................................. 2019282

(51) Int. Cl.
*H02M 3/158* (2006.01)
*H02M 1/00* (2006.01)
*H02M 1/14* (2006.01)

(52) U.S. Cl.
CPC ....... *H02M 3/1582* (2013.01); *H02M 1/0009* (2021.05); *H02M 1/143* (2013.01)

(58) Field of Classification Search
CPC ..... G05F 1/00; G05F 1/10; G05F 1/12; G05F 1/46; G05F 1/455; G05F 1/45;
(Continued)

(56) References Cited

U.S. PATENT DOCUMENTS 9,831,780 B2 * 11/2017 Hong ................... H02M 3/1582
11,532,986 B2 * 12/2022 Rainer ................ H02M 7/4837
(Continued)

FOREIGN PATENT DOCUMENTS

CN 107395037 A 11/2017
EP 2579434 A2 4/2013
(Continued)

OTHER PUBLICATIONS

Examination Report received for GB Application No. 2019282.9, mailed on Jul. 10, 2023, 4 pages.
(Continued)

*Primary Examiner* — Sean Kayes
*Assistant Examiner* — Nusrat Quddus
(74) *Attorney, Agent, or Firm* — Tucker Ellis LLP (57) ABSTRACT

A buck-boost converter is described that includes input terminals, output terminals, a first group of devices, a second group of devices, an inductor, a capacitor, and a controller. Each group of devices includes a first switch, a second switch, and a third switch or diode connected in series. Each group of devices further includes a first node located between the first switch and the second switch, and a second node located between the second switch and the third switch or diode. A first of the input terminals is connected to the first node of the first group of devices, and a second of the input terminals is connected to the first node of the second group of devices. The inductor is connected between the second node of the first group of devices and the second node of the second group of devices. The first group of devices, the second group of devices, and the capacitor are connected in parallel across the output terminals, and the controller controls the switches of the first group of devices and the second group of devices.

11 Claims, 8 Drawing Sheets

(58) Field of Classification Search
CPC ... G05F 1/445; G05F 1/66; G05F 1/40; G05F 1/42; G05F 1/44; G05F 1/462; G05F 1/52; G05F 1/56; G05F 3/10; G05F 3/16; G05F 3/18; G05F 3/185; G05F 3/20; G05F 3/26; G05F 3/30; G05F 3/205; G05F 3/22; G05F 3/24; G05F 3/222; G05F 3/242; G05F 3/225; G05F 3/227; G05F 3/245; G05F 3/247; G05F 3/262; G05F 3/265; G05F 3/267; G05F 1/575; H02M 5/2573; H02M 1/081; H02M 5/293; H02M 7/12; H02M 3/10; H02M 3/125; H02M 3/13; H02M 3/135; H02M 3/145; H02M 3/15; H02M 3/155; H02M 3/156; H02M 3/158; H02M 3/1588; H02M 2003/1566; H02M 3/1582; H02M 2003/1557; H02M 3/1584; H02M 3/285; H02M 3/33561; H02M 7/49; H02M 1/045; H02M 7/006; H02M 7/06; H02M 7/068; H02M 7/153; H02M 7/10; H02M 1/088; H02M 7/103; H02M 7/106; H02M 7/19; H02M 7/08; H02M 7/17; H02M 2001/007; H02M 7/493; H02M 7/53806; H02M 7/5381; H02M 7/483; H02M 7/217; H02M 7/538466; H02M 7/5387; H02M 7/53871; H02M 7/53873; H02M 7/53875; H02M 1/084; H02M 1/0845; H02M 5/40; H02M 5/42; H02M 5/453; H02M 7/7575; H02M 5/458; H02M 5/45; H02M 5/4585; H02M 5/4505; H02M 5/451; H02M 5/452; H02M 5/447; H02M 5/456; H02M 1/12; H02M 1/4266; H02M 2001/123; H02M 3/07; H02M 3/073; H02M 2003/071; H02M 2003/072; H02M 2003/075; H02M 2003/076; H02M 2003/077; H02M 2003/078; H02M 2001/0048; H02M 1/42; H02M 1/4208; H02M 1/4216; H02M 1/4225; H02M 1/4233; H02M 1/4241; H02M 1/425; H02M 1/4258; H02M 2001/4275; H02M 2001/4283; H02M 2001/4291; H05B 39/048; B23K 11/24; H04B 2215/069; H02J 3/46; H02J 3/38; H02J 3/36; H02J 3/01; H02H 7/261; H02H 7/268

See application file for complete search history.

(56) References Cited

U.S. PATENT DOCUMENTS

| | | |
|---|---|---|
| 11,695,340 B2 * | 7/2023 | Lee .................... H02M 1/08 323/282 |
| 2013/0088904 A1 | 4/2013 | Yamanaka et al. |
| 2014/0133202 A1 | 5/2014 | Tamaoka |
| 2015/0022164 A1 | 1/2015 | Ye et al. |
| 2015/0171763 A1 | 6/2015 | Kondo et al. |
| 2021/0050773 A1 | 2/2021 | Lin et al. |
| 2023/0068053 A1 * | 3/2023 | Chang ................ H02M 1/0054 |
| 2024/0006997 A1 * | 1/2024 | Greetham ........... H02M 1/0009 |

FOREIGN PATENT DOCUMENTS

| | | |
|---|---|---|
| EP | 2725698 A1 | 4/2014 |
| JP | 2003-070262 A | 3/2003 |
| WO | 2022/123203 A1 | 6/2022 |

OTHER PUBLICATIONS

International Search Report and Written Opinion received for PCT Patent Application No. PCT/GB2021/052952, mailed on Feb. 24, 2022, 11 pages.

International Search Report and Written Opinion received for PCT Patent Application No. PCT/GB2021/052953, mailed on Feb. 24, 2022, 11 pages.

4 Search Report received for GB Application No. 2019282.9, mailed on Apr. 7, 2021, 1 page.

* cited by examiner

AC-DC BUCK-BOOST CONVERTER

CROSS-REFERENCE TO PRIOR APPLICATION

This application is a § 371 National Stage Application of PCT International Application No. PCT/GB2021/052953 filed Nov. 15, 2021, which claims the priority of United Kingdom Application No. 2019282.9, filed Dec. 8, 2020, each of which are herein incorporated by reference in their entirety.

FIELD OF THE INVENTION

The present invention relates to a buck-boost converter.

BACKGROUND OF THE INVENTION

Buck-boost converters typically provide DC-to-DC conversion. Where AC-to-DC conversion is required, a front-end bridge rectifier and bulk capacitor are generally provided. Bridgeless buck-boost converters that provide AC-to-DC conversion are known. However, the topologies and/or the control schemes are typically complex.

SUMMARY OF THE INVENTION

The present invention provides a buck-boost converter comprising: input terminals for connection to a power supply supplying an alternating input voltage; output terminals for outputting an output voltage; a first group of devices and a second group of devices, each group of devices comprising: a first switch, a second switch, and a third switch or diode connected in series; a first node located between the first switch and the second switch; and a second node located between the second switch and the third switch or diode; an inductor; a capacitor; and a controller for controlling the switches of the first group of devices and the second group of devices, wherein: a first of the input terminals is connected to the first node of the first group of devices; a second of the input terminals is connected to the first node of the second group of devices; the inductor is connected between the second node of the first group of devices and the second node of the second group of devices; the first group of devices, the second group of devices, and the capacitor are connected in parallel across the output terminals; the first switch of each group of devices has an OFF state in which the switch is non-conductive in both directions; and the second switch of each group has an ON state in which the switch is conductive in both directions.

The converter therefore provides AC-to-DC conversion without the need for a rectifier bridge or front-end bulk capacitor. Moreover, in comparison to other bridgeless buck-boost converters, the topology of the converter is less complex. In particular, the converter is capable of providing AC-to-DC conversion using just six devices (i.e. six switches, or four switches and two diodes), an inductor and a capacitor. Other bridgeless buck-boost converters have a higher number of switches and/or additional inductors.

The first switches have an OFF state in which the switch is non-conductive in both directions. The switches can therefore be controlled such that (i) current does not flow directly from the power supply to the capacitor when the instantaneous value of the input voltage is greater than the output voltage, and/or (ii) current does not flow from the capacitor to the power supply when the instantaneous value of the input voltage is less than the output voltage.

The second switches have an ON state in which the state is conductive in both directions. The switches are therefore capable of conducting in a first direction when the polarity of the input voltage is positive and current flows through the inductor in one direction, and are capable of conducting in a second direction with the polarity of the input voltage is negative and current flows through the inductor in an opposite direction. The second switch may comprise a controllable device that conducts in both directions when ON. Alternatively, the second switch may comprise a controllable device that conducts in one direction only when ON, but includes an antiparallel diode that conducts in the other direction.

With the topology of the converter, the second switches are primarily responsible for controlling the energisation of the inductor and the subsequent transfer of inductive energy to the capacitor. Whilst the first switches provide a path for the inductive energy, they play no part in the energisation of the inductor. The controller may therefore switch the first switches at a lower frequency than that of the second switches. This is beneficial since the first switches, which are required to have an OFF state in which they do not conduct in either direction, may be comparatively more difficult to control and/or have a lower rated switching frequency. For example, the first switches may be double gated.

The controller may switch the first switches at a frequency of the input voltage. This then has the advantage that the first switches are switched at a relatively low frequency, e.g. around 50 Hz or 60 Hz.

The controller may control the switches such that the first switch of the first group of devices is OFF and the first switch of the second group of devices is ON when the polarity of the input voltage is positive, and the first switch of the first group of devices is ON and the first switch of the second group of devices is OFF when the polarity of the input voltage is negative. Accordingly, only one of the first switches is ON at any one time. Moreover, each of the first switches is ON for one half-cycle of the input voltage, and OFF for the other half-cycle.

The controller may control the switches such that the second switch of the second group of devices is ON and the second switch of the first group of devices is repeatedly switched when the polarity of the input voltage is positive, and the second switch of the first group of switches is ON and the second switch of the second group of switches is repeatedly switched when the polarity of the input voltage is negative. Accordingly, during each half-cycle of the input voltage, one of the second switches is ON throughout and the other of the second switches is repeated switched between ON and OFF. One of the second switches is therefore switched at a higher frequency than that of the input voltage.

The second switches and the third switches may be the same type of switch. With the topology of the converter, the second and third switches of both groups of devices effectively form an H-bridge. Accordingly, by using the same type of switch for the second and third switches, the converter may be implemented in part using commercially available H-bridge integrated circuits, thus reducing the cost.

The controller may switch the first switches at a frequency less than 500 Hz, and the second switches at a frequency greater than 10 kHz. The first and second switches are therefore switched at very different frequencies. The first switches are switched at a relatively low frequency, which has the benefit of lower switching losses. However, perhaps more importantly, the first switches, which are required to have an OFF state in which they do not conduct in either direction, may be comparatively more difficult to control and/or have a lower rated switching frequency. By switching at a frequency less than 500 Hz, a simpler driver and/or switches having a low rated switching frequency may be used. In contrast, by switching the second switches at a frequency greater than 10 kHz, an inductor of relatively low inductance may be employed. Additionally, ripple in the input current drawn from the power supply may kept be relatively low.

The first switches may have an ON state in which the switches are conductive in both directions. This then has the advantage that zero-voltage switching may be achieved when turning ON the second switches. Additionally or alternatively, the converter may be used for bidirectional power transfer, i.e. power may be transferred from the power supply to the capacitor (forward power transfer), and power may be transferred from the capacitor to the power supply (reverse power transfer).

The controller may configure the switches in a configuration in which the inductor is energised by the power supply, and a further configuration in which energy stored in the inductor is transferred to the capacitor. Moreover, the controller may switch between the configuration and the further configuration throughout each half-cycle of the input voltage. This then simplifies the control of the switches. In particular, irrespective of the instantaneous value of the input voltage, the converter uses the same mode of operation in which the switches are switched between the two configurations. The converter does not, for example, have discreet boost and buck modes of operation, with each mode having a different set of configurations.

The controller may configure the switches such that (i) in the configuration the first switch of one group of devices is OFF, the first switch of the other group of devices is ON, and the second switches of both groups of devices are ON, and (ii) in the further configuration the first and second switches of one group of devices is OFF, and the first and second switches of the other group of devices is ON.

The present invention also provides a buck-boost converter comprising: input terminals for connection to a power supply supplying an alternating input voltage; output terminals for outputting an output voltage; a first group of devices and a second group of devices, each group of devices comprising: a first switch, a second switch, and a third switch or diode connected in series; a first node located between the first switch and the second switch; and a second node located between the second switch and the third switch or diode; an inductor; a capacitor; and a controller for controlling the switches of the first group of devices and the second group of devices, wherein: a first of the input terminals is connected to the first node of the first group of devices; a second of the input terminals is connected to the first node of the second group of devices; the inductor is connected between the second node of the first group of devices and the second node of the second group of devices; the first group of devices, the second group of devices, and the capacitor are connected in parallel across the output terminals; and the controller configures the switches in (i) a configuration in which the first switch of one group of devices is OFF, the first switch of the other group of devices is ON, and the second switches of both groups of devices are ON, thereby causing the inductor to be energised by the power supply, and (ii) a further configuration in which the first and second switches of one group of devices are OFF, and the first and second switches of the other group of devices are ON, thereby causing energy stored in the inductor to be transferred to the capacitor.

BRIEF DESCRIPTION OF THE DRAWINGS

Embodiments will now be described, by way of example, with reference to the accompanying drawings in which.

DETAILED DESCRIPTION OF THE INVENTION

Figure 1:
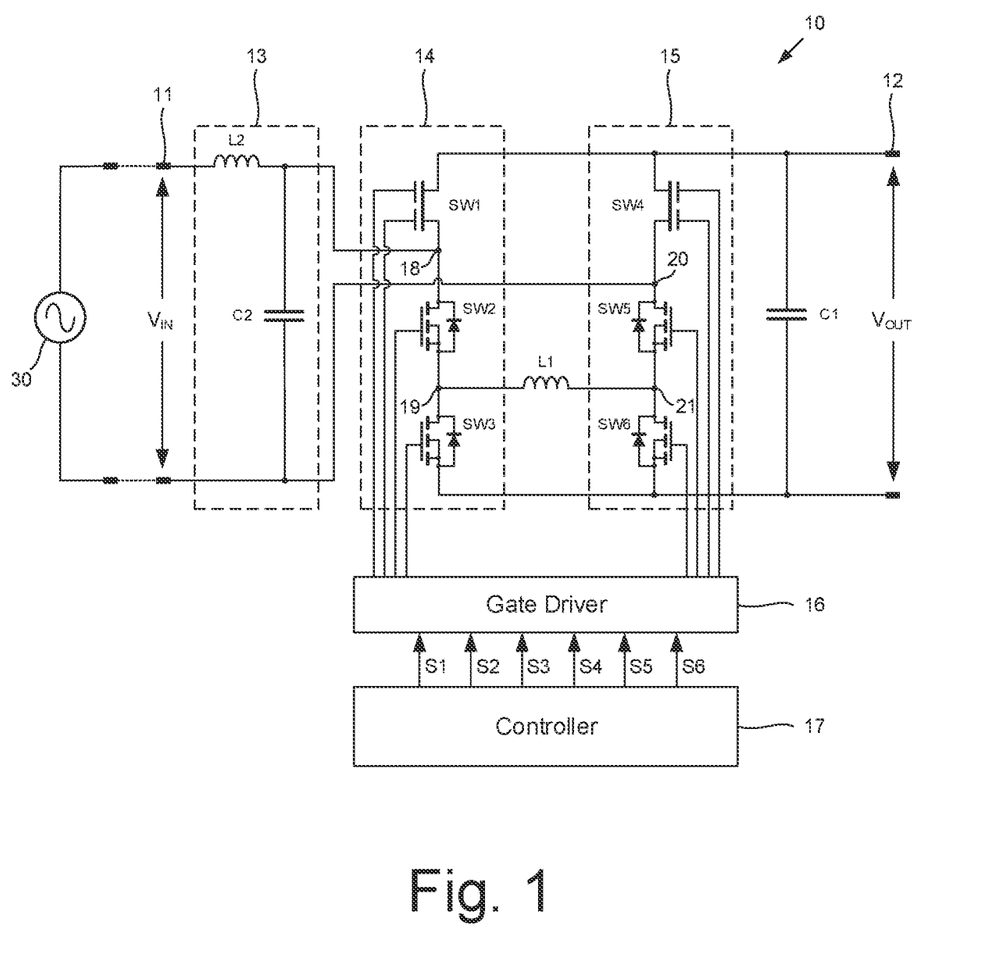
FIG. 1 is a schematic diagram of a buck-boost converter.

The buck-boost converter 10 of FIG. 1 comprises input terminals 11 for connection to a power supply 30 supplying an alternating input voltage VIN, and output terminals 12 for outputting an output voltage VOUT. The converter 10 further comprises an input filter 13, a first group of devices 14, a second group of devices 15, an inductor L1, and capacitor C1, a gate driver 16 and a controller 17.

The input filter 13 comprises an inductor L2 and a capacitor C1, and attenuates high-frequency ripple in the input current drawn from the power supply 30. Whilst the input filter 13 has particular benefits and may be required for regulatory compliance (e.g. harmonics), the input filter 13 is not required for AC-to-DC conversion and could conceivably be omitted.

Each group of devices 14,15 comprises a first switch SW1,SW4, a second switch SW2,SW5, and a third switch SW3,SW6 or diode connected in series. Each group of devices 14,15 further comprises a first node 18,20 located between the first switch and the second switch, and a second node 19,21 located between the second switch and the third switch or diode.

Each of the first switches SW1,SW4 has an ON state in which the switch is conductive in one or both directions and an OFF state in which the switch is non-conductive in both directions. The switch therefore differs from, say, a MOSFET, which continues to conduct in one direction when in an OFF state owing to the inherent body diode. In the example illustrated in FIG. 1, each of the first switches SW1,SW4 is a bidirectional switch having an ON state in which the switch conducts in both directions, and an OFF state in which the switch conducts in neither direction.

Each of the second switches SW2,SW5 has an ON state in which the switch is conductive in both directions, and an OFF state in which the switch is non-conductive in one or both direction. Unlike the first switch, there is no requirement for the second switch to have an open-circuit state when in the OFF state. The second switch may comprise a controllable device that conducts in both directions when turned on (e.g. MOSFET or GaN device). Alternatively, the second switch may comprise a controllable device that conducts in one direction only when turned on (e.g. IGBT) and includes an antiparallel diode that conducts in the other direction. The switch therefore has an ON state in which it conducts in both directions. Although there is no requirement for the switch to have an open-circuit state when in the OFF state, a bidirectional switch of the type described in the preceding paragraph may nevertheless be used.

Each group of devices 14,15 comprises a third switch or diode. In the example illustrated in FIG. 1, each group comprises a third switch SW3,SW6. As explained below in more detail, the switch or diode provides a path for inductive current when charging the capacitor C1. Where a third switch is employed, the switch has a state in which it conducts in one direction only, i.e. functions as a diode. This then avoids a short-circuit during switching (described below) whilst providing a path for the inductive current. By way of example only, the switch may be a MOSFET or GaN device, which conducts in one direction only when in an OFF state. As a further example, the switch may be a bidirectional switch having a diode state, i.e. a state in which the switch conducts in one direction only. The use of a switch over a diode has the advantage of lower conduction losses, and may therefore be used to provide synchronous rectification.

One of the input terminals 11 is connected to the first node 18 of the first group of devices 14, and the other of the input terminals 11 is connected to the first node 20 of the second group of devices 15. The inductor L1 is connected between the second node 19 of the first group of devices 14 and the second node 21 of the second group of devices 15. That is to say that the inductor L1 is connected at one end to the second node 19 of the first group 14 and at the opposite end to the second node 20 of the second group 15. The first group of devices 14, the second group of devices 15, and the capacitor C1 are then connected in parallel across the output terminals 12.

The controller 17 is responsible for controlling the operation of the converter 10 and generates control signals S1-S6 for controlling each of the switches SW1-SW6. The control signals are output to the gate driver 16, which in response outputs gate signals for driving the switches.

Operation of the converter will now be described with reference to FIGS. 2 to 4.

Figure 2:
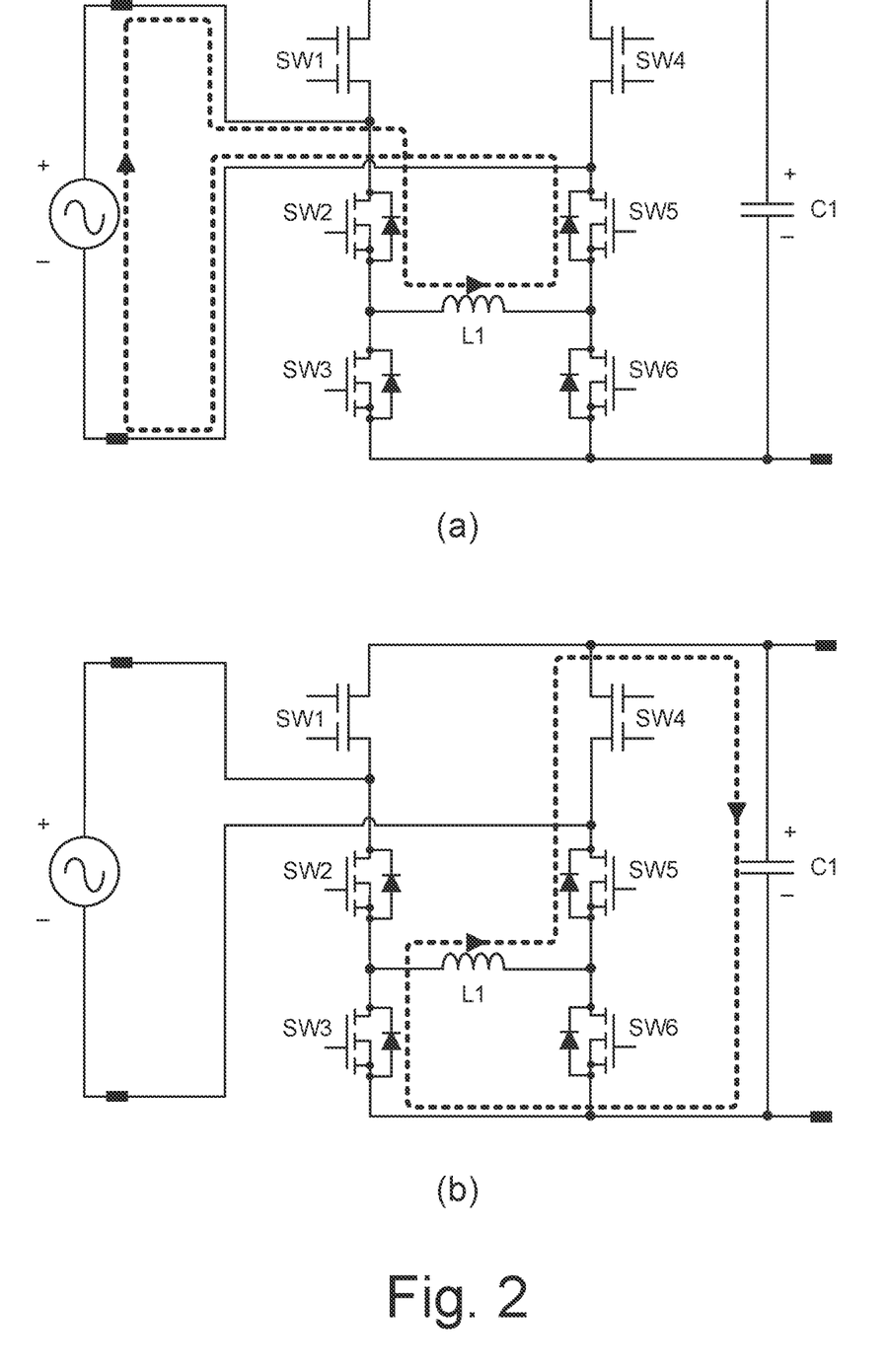
FIG. 2 illustrates configurations of the converter when a polarity of an input voltage is positive.

FIG. 2 illustrates two different configurations of the switches when the polarity of the input voltage is positive. In the first configuration, shown in FIG. 2(*a*), the first switch SW1 of the first group is OFF, the first switch SW4 of the second group is ON, the second switches SW2,SW5 of both groups are ON, and the third switches SW3,SW6 of both groups are OFF. As a result, the inductor L1 is energised by the power supply, with current flowing through the inductor L1 in a direction from left to right. In the second configuration, shown in FIG. 2(*b*), the first switch SW1 of the first group is OFF, the first switch SW4 of the second group is ON, the second switch SW2 of the first group is OFF, the second switch SW5 of the first group is ON, the third switch SW3 of the first group is ON and the third switch SW6 of the second group is OFF. Energy stored in the inductor L1 is then transferred to the capacitor C1.

The only difference between the two configurations is the states of the second and third switches SW2,SW3 of the first group. In particular, the second switch SW2 is ON and the third switch SW3 is OFF in the first configuration, and the second switch SW2 is OFF and the third switch SW3 is ON in the second configuration. As noted above, the third switch could conceivably be a diode. In this instance, the only difference between the two configurations would be the state of the second switch of the first group. However, the provision of the third switch enables synchronous rectification to be achieved, thereby improving the efficiency of the converter.

There is a deadtime between turning OFF the second switch SW2 and turning ON third switch SW3, and vice versa. This then prevents a short circuit down through switches SW2,SW3 and up through switches SW6,SW5. This may be implemented by the controller 17 (i.e. by introducing a deadtime between changes in signals S2 and S3) or by the gate driver 16 (i.e. by introducing a deadtime between changes in the gate signals for switches SW2 and SW3). During the deadtime, a path is provided for the inductive current through the body diode of the third switch SW3. This then has the advantage that zero-voltage switching may be achieved when turning ON the third switch, thereby further improving efficiency.

The controller 17 repeatedly switches between the first configuration and the second configuration in order to transfer power from the power supply 30 to the capacitor C1. The controller 17 switches between the two configurations at a duty, which the controller 17 controls in order to regulate the output voltage VOUT whilst also shaping the current drawn from the power supply 30.

Figure 3:
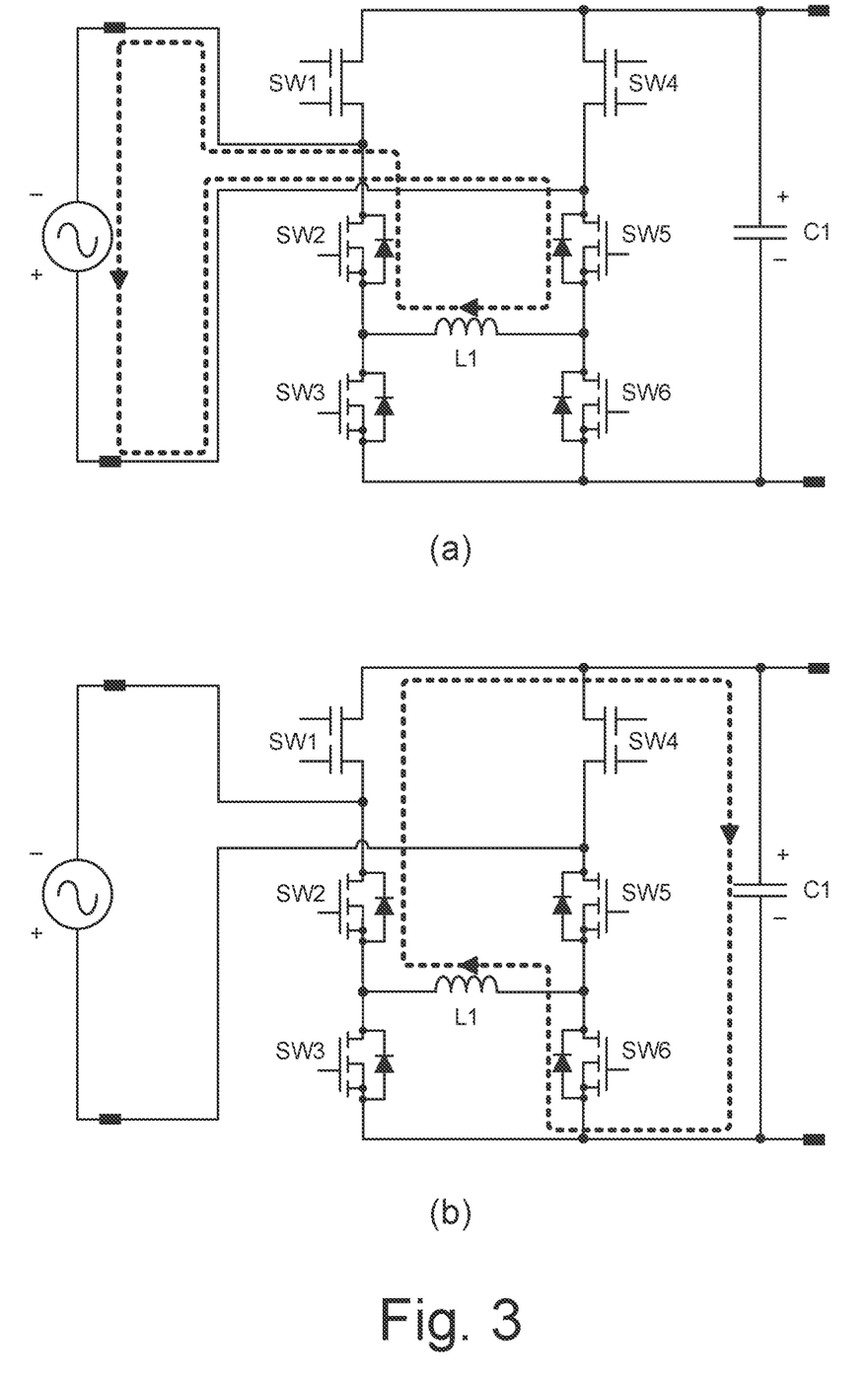
FIG. 3 illustrates configurations of the converter when the polarity of the input voltage is negative.

FIG. 3 illustrates two further configurations of the switches when the polarity of the input voltage is negative. In the third configuration, shown in FIG. 3(*a*), the first switch SW1 of the first group is ON, the first switch SW4 of the second group is OFF, the second switches SW3,SW5 of both groups are ON, and the third switches SW3,SW6 of both groups are OFF. As a result, the inductor L1 is energised by the power supply, with current flowing through the inductor L1 in a direction from right to left. In the fourth configuration, shown in FIG. 3(*b*), the first switch SW1 of the first group is ON, the first switch SW4 of the second group is OFF, the second switch SW2 of the first group is ON, the second switch SW5 of the second group is OFF, the third switch SW3 of the first group is OFF and the third switch SW6 of the second group is ON. Energy stored in the inductor L1 is then transferred to the capacitor C1.

It will be apparent that third and fourth configurations mirror that of the first and second configurations. For example, the only difference between the third and fourth configurations is the states of the second and third switches SW5,SW6 of the second group. In particular, the second switch SW5 is ON and the third switch SW6 is OFF in the third configuration, and the second switch SW5 is OFF and the third switch SW6 is ON in the fourth configuration. Again, the third switch could conceivably be a diode, in which case the state of the second switch only changes.

Again, the controller 17 repeatedly switches between the third configuration and the fourth configuration in order to transfer power from the power supply 30 to the capacitor C1. And again, the controller 17 switches between the two configurations at a duty which the controller 17 controls so as to regulate the output voltage VOUT whilst also shaping the current drawn from the power supply 30.

Figure 4:
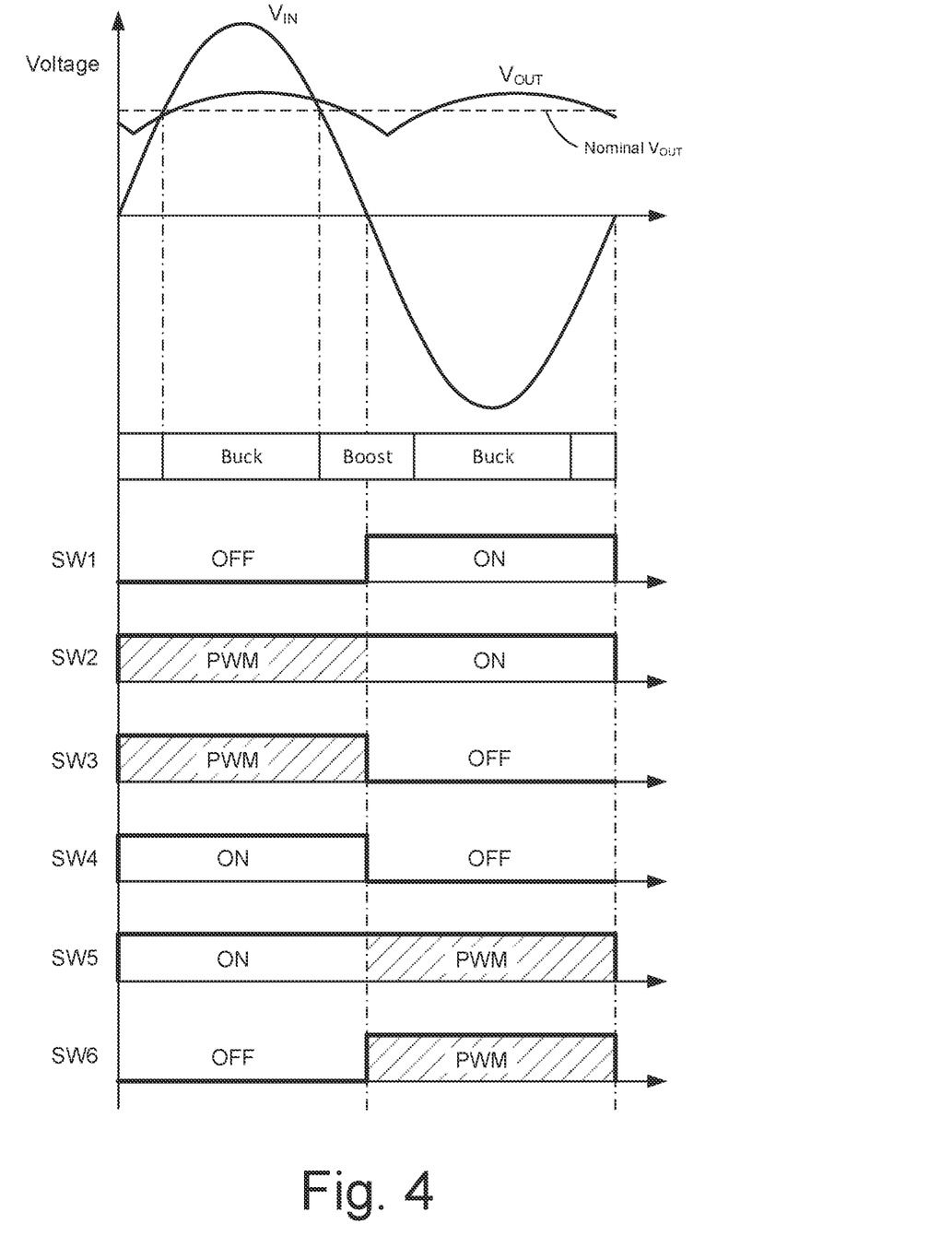
FIG. 4 illustrates the states of the switches of the converter over a cycle of the input voltage.

FIG. 4 illustrates the states of the switches SW1-SW6 over one cycle of the input voltage VIN.

The states of the first switches SW1,SW4 change only in response to a change in the polarity of the input voltage VIN. In particular, the first switch SW1 of the first group is OFF and the first switch SW4 of the second group is ON when the polarity of the input voltage is positive, and the first switch SW1 of the first group is ON and the first switch SW4 of the second group is OFF when the polarity of the input voltage is negative. The first switches SW1,SW4 are therefore switched at the frequency of the input voltage VIN. By contrast, the second switches SW2,SW5 are switched at a higher frequency.

During each half-cycle of the input voltage VIN, one of the second switches remains ON throughout and the other of the second switches is repeatedly switched between ON and OFF. In the particular example illustrated in FIGS. 2 to 4, the second switch of the second group SW5 is ON and the second switch of the first group SW2 is repeatedly switched when the polarity of the input voltage is positive (FIG. 2), and the second switch of the first group SW2 is ON and the second switch of the second group SW5 is repeatedly switched when the polarity of the input voltage is negative (FIG. 3). The second switches SW2,SW5 are therefore switched at a higher frequency than that of the input voltage VIN.

The second switches SW2,SW5 are responsible for controlling the transfer of power from the power supply 30 to the capacitor C1. In particular, when both switches are ON, the inductor L1 is energised, and when one of the second switches is subsequently turned OFF, energy stored in the inductor L1 is transferred to the capacitor C1. The controller 17 switches the second switches at a particular duty, which defines the ratio of the time spent energising the inductor L1 and the time spent charging the capacitor C1. As noted, the controller 17 controls the duty in order to regulate the output voltage VOUT whilst shaping the current drawn from the power supply 30. The controller 17 may control the duty in the same or similar manner as that of a conventional PFC boost converter, in which the duty is controlled using an inner, faster current loop and an outer, slower voltage loop.

As the switching frequency of the second switches SW2, SW5 increases, the ripple in the inductor current decreases and therefore an inductor have a smaller inductance may be employed. The current drawn from the power supply 30 is discontinuous. In particular, when one of the second switches is OFF and energy is transferred from the inductor L1 to the capacitor C1 (e.g. FIGS. 2(b) and 3(b)), no current is drawn from the power supply 30. The input filter 13 then acts to smooth these gaps in the input current. By increasing the switching frequency of the second switches, a smaller input filter (i.e. having a smaller inductance and/or capacitance) may be used.

The frequency of the input voltage is likely to be 50 Hz or 60 Hz, although frequencies as high as 400 Hz are not unknown. The switching frequency of the first switches SW1,SW4 may therefore be said to be less than 500 Hz. By contrast, the second switches SW2,SW5 may be switched at frequencies of at least 10 kHz. Indeed, switching frequencies of at least 100 kHz are achievable with many MOSFET devices. Moreover, where GaN devices are employed, frequencies of at least 1 MHz are possible. The size of the inductor L1 and/or the input filter 13 may therefore be reduced significantly through the use of GaN devices.

The converter 10 provides AC-to-DC conversion without the need for a rectifier bridge or front-end bulk capacitor. In comparison to other bridgeless buck-boost converters, the topology of the converter is less complex. In particular, the converter provides AC-to-DC conversion using just six devices (i.e. six switches, or four switches and two diodes), an inductor and a capacitor. Other bridgeless buck-boost converters have a higher total number of switches, a higher number of bidirectional switches (which are comparatively expensive) and/or additional inductors. Moreover, the bidirectional switches of other buck-boost converters are switched at relatively high frequencies. By contrast the first switches of the present converter, which may be bidirectional switches, are switched at the relatively low frequency of the input voltage.

The converter 10 does not have discreet boost and buck modes of operation. Instead, irrespective of the instantaneous value of the input voltage, the controller 17 uses the same mode of operation in which the switches are switched between two configurations (i.e. the first and second configurations when the input voltage is positive, and the third and fourth configurations when the input voltage is negative). Control of the switches is therefore simpler in comparison to that of other buck-boost converters which have discreet boost and buck modes, with each mode having a different set or sequence of switch configurations.

With the topology of the present converter, the second and third switches SW2,SW3,SW5,SW6 of both groups effectively form an H-bridge. Accordingly, the converter 10 may be implemented in part using commercially available H-bridge integrated circuits, thus reducing the cost.

In the example described above, the first switches SW1, SW4 are bidirectional. That is to say that the switches conduct in both directions when in an ON state. However, as will be apparent from FIGS. 2 and 3, each of the first switches SW1,SW4 is only ever required to conduct in one direction (i.e. upwards in FIGS. 2 and 3). However, employing bidirectional switches has at least two advantages, which will now be described.

The first advantage of having bidirectional switches is that zero-voltage switching may be achieved when turning ON the second switches SW2,SW5, i.e. when moving from the second configuration to first configuration, or when moving from the fourth configuration to the third configuration.

Figure 5:
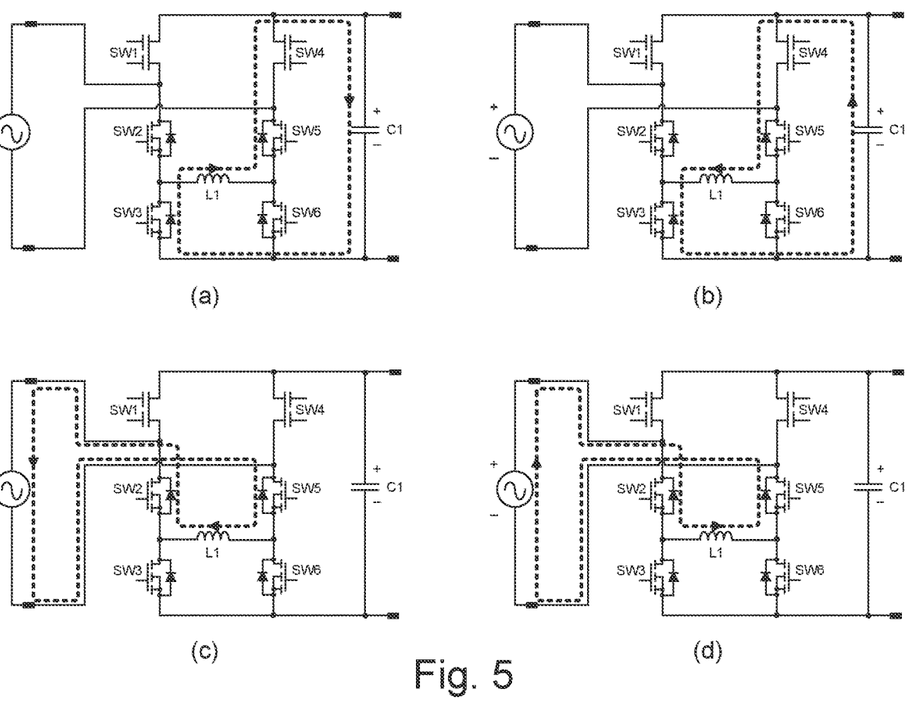
FIG. 5 illustrates configurations of the converter for achieving zero-voltage switching when the polarity of the input voltage is positive.

FIG. 5 illustrates a sequence of steps when moving from the second configuration to the first configuration. FIG. 5(a) corresponds to the second configuration shown in FIG. 2(b), in which energy stored in the inductor L1 is transferred to the capacitor C1.

As energy is transferred to the capacitor C1, current flowing through the inductor L1 decreases. When all energy stored in the inductor L1 has been transferred to the capacitor C1, the current through the inductor L1 is zero. At this stage, there is no self-induced voltage across the inductor L1 and therefore the capacitor C1 begins to energise the inductor L1, i.e. energy now transfers from the capacitor to the inductor, causing current to flow through the inductor in the opposite direction. This is the situation illustrated in FIG. 5(b). Upon detecting a change in the polarity of the current through the inductor L1, the controller 17 switches from the second configuration to the first configuration. As already noted, there is a deadtime between turning OFF the third switch SW3 and turning ON the second switch SW2. There is therefore a period during which both switches are OFF. This is the situation illustrated in FIG. 5(c). As a result of turning OFF the third switch SW3, a voltage is induced across the inductor L1 which cause current to be driven through the diode of the second switch SW2. At the end of the deadtime, switch SW2 is turned ON. However, with the diode of the second switch SW2 already conducting, the voltage across the switch is zero. With the second switch SW2 turned ON, the switches are now in the first configuration. This is the situation illustrated in FIG. 5(d), which corresponds to FIG. 2(a). Current in the inductor L1 quickly reverses and the inductor L1 is energised by the power supply 30.

Figure 6:
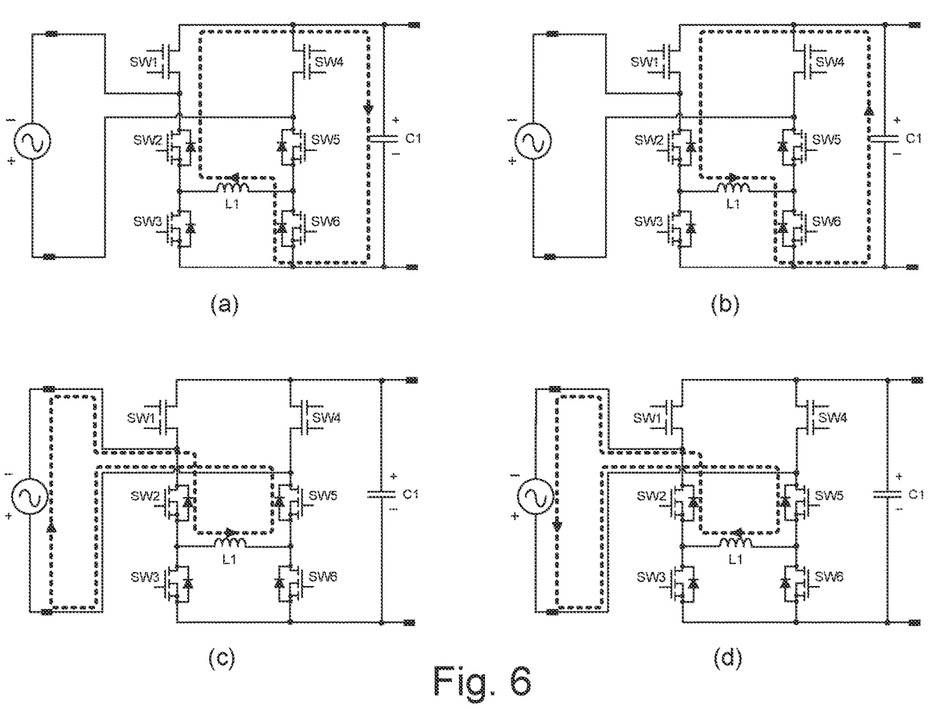
FIG. 6 illustrates configurations of the converter for achieving zero-voltage switching when the polarity of the input voltage is negative.

FIG. 6 illustrates the corresponding sequence of steps when moving from the fourth configuration to the third configuration. FIG. 6(a) corresponds to the fourth configuration shown in FIG. 3(b), and FIG. 6(d) corresponds to the third configuration shown in FIG. 3(a). Again, with the diode of the second switch SW5 conducting (FIG. 6(c)), zero-voltage switching is achieved when turning ON second switch SW5 (FIG. 6(d)).

The second advantage of having bidirectional switches is that the converter 10 may be used for bidirectional power transfer. That is to say that power may be transferred from the power supply 30 to the capacitor C1 in the manner described above (i.e. forward power transfer). Additionally, power may be transferred from the capacitor C1 to the power supply 30 (i.e. reverse power transfer), as will now be described.

Figure 7:
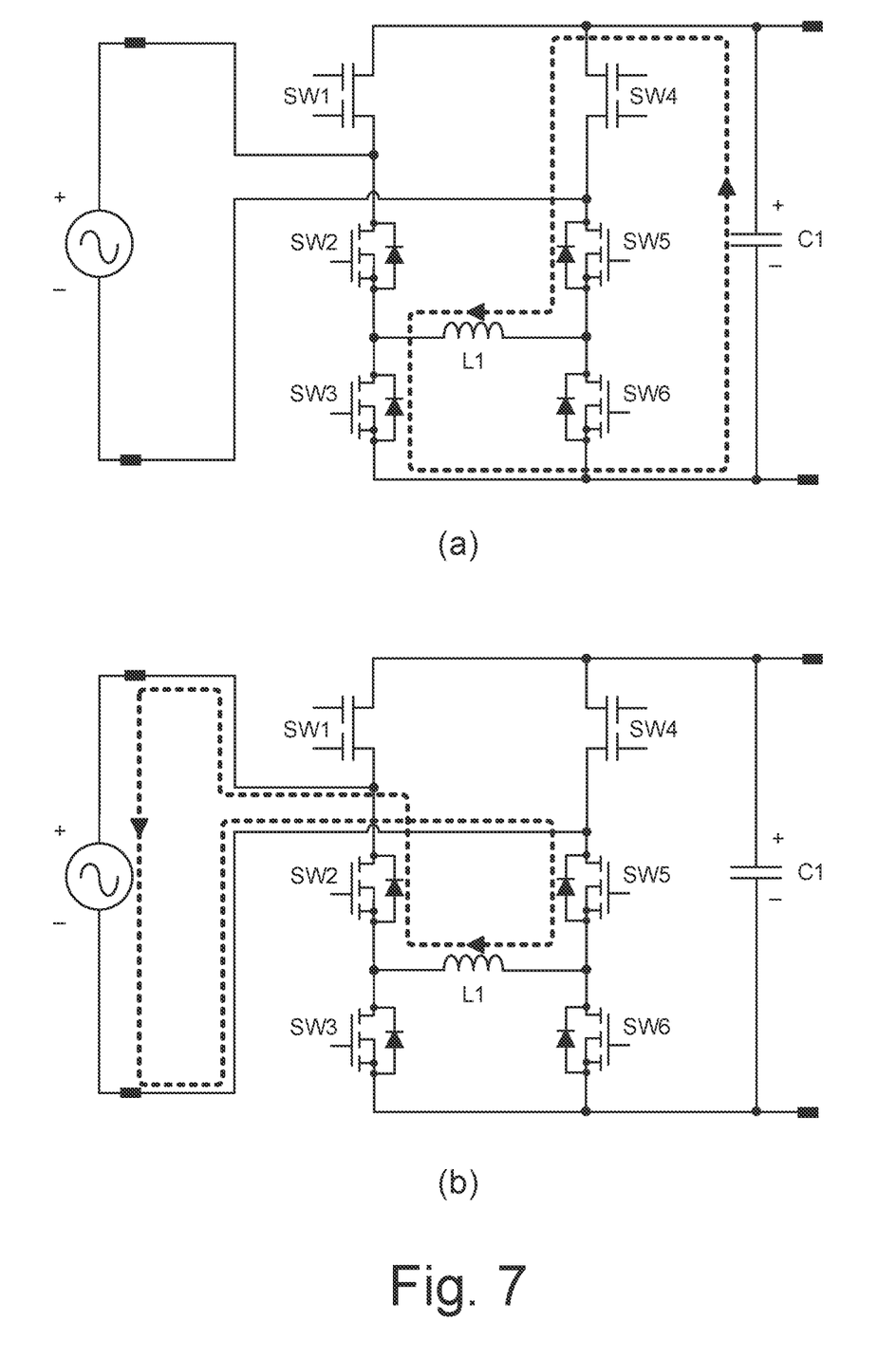
FIG. 7 illustrates configurations of the converter for reverse power transfer when the polarity of the input voltage is positive.
Figure 8:
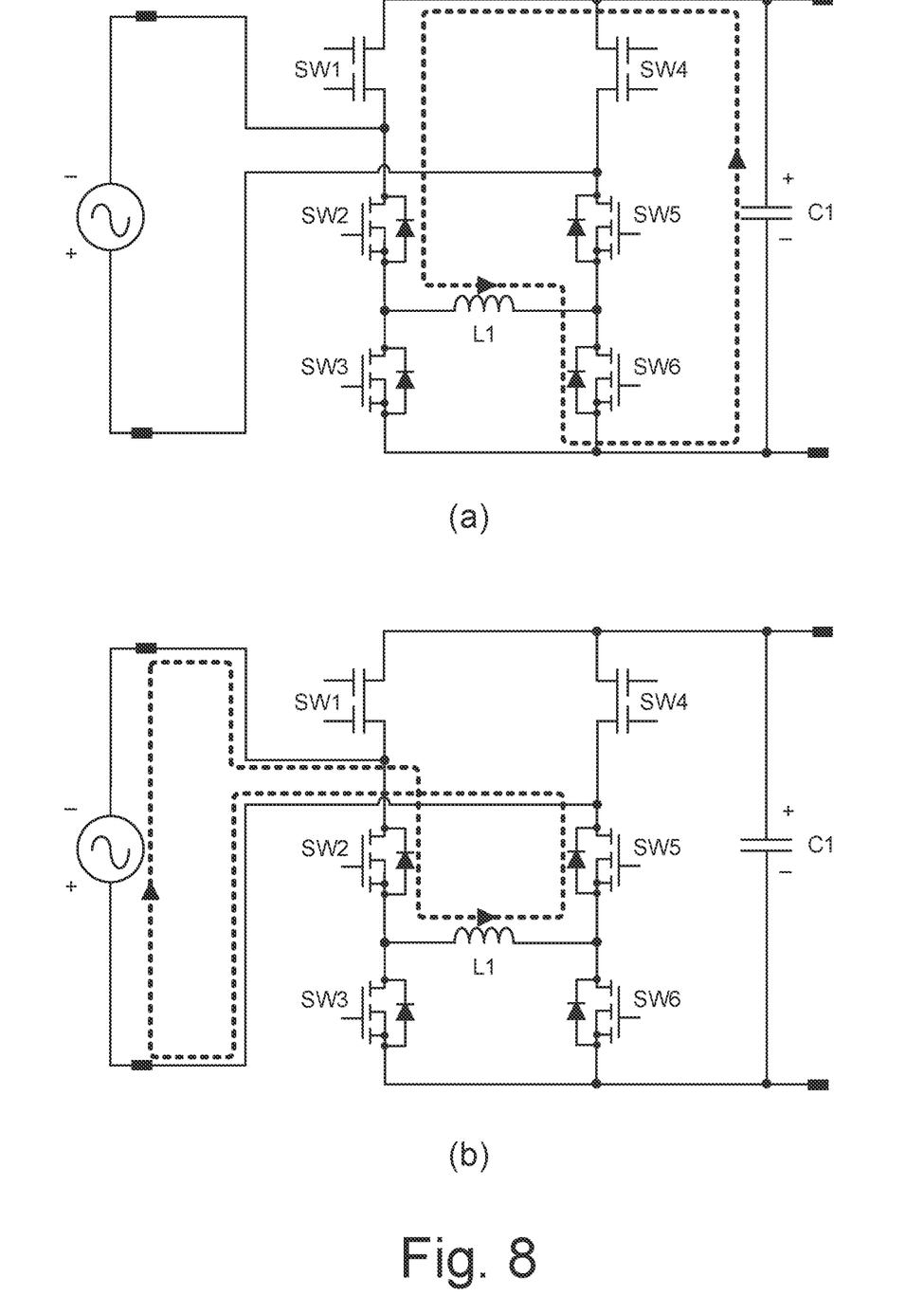
FIG. 8 illustrates configurations of the converter for reverse power transfer when the polarity of the input voltage is negative.

FIGS. 7 and 8 illustrate reverse power transfer (i.e. from the capacitor to the power supply) when the polarity of the input voltage VIN is positive (FIG. 7) and negative (FIG. 8).

FIG. 7 illustrates two different configurations of the switches. In the configuration of FIG. 7(a), the first switch SW1 of the first group is OFF, the first switch SW4 of the second group is ON, the second switch SW2 of the first group is OFF, the second switch SW5 of the second group is ON, the third switch SW3 of the first group is ON and the third switch SW6 of the second group is OFF. As a result, the inductor L1 is energised by the capacitor C1, with current flowing through the inductor L1 in a direction from right to left. In the configuration of FIG. 7(b), the first switch SW1 of the first group is OFF, the first switch SW4 of the second group is ON, the second switches SW2,SW5 of both groups are ON, and the third switches SW3,SW6 of both groups are OFF. As a result, energy stored in the inductor L1 is transferred to the power supply 30.

FIG. 8 similarly illustrates two different configurations of the switches. In the configuration of FIG. 8(a), the first switch SW1 of the first group is ON, the first switch SW4 of the second group is OFF, the second switch SW2 of the first group is ON, the second switch SW5 of the second group is OFF, the third switch SW3 of the first group is OFF and the third switch SW6 of the second group is ON. As a result, the inductor L1 is energised by the capacitor C1, with current flowing through the inductor L1 in a direction from left to right. In the configuration of FIG. 8(b), the first switch SW1 of the first group is ON, the first switch SW4 of the second group is OFF, the second switches SW2,SW5 of both groups are ON, and the third switches SW3,SW6 of both groups are OFF. As a result, energy stored in the inductor L1 is transferred to the power supply 30.

The configurations illustrated in FIG. 7 are the same as those of FIG. 2. For example, the configuration of FIG. 7(a) corresponds to that of FIG. 2(b), and the configuration of FIG. 7(b) corresponds to that of FIG. 2(a). The same is true of the configurations of FIGS. 8 and 3. Accordingly, reverse power transfer may be achieved using the same switching configurations as that for forward power transfer. Moreover, zero-voltage switching of the second switches SW2,SW5 can be achieved in the same manner as that described above, i.e. by monitoring the inductor current and switching configurations (e.g. from FIG. 7(a) to FIG. 7(b)) when the polarity of the current changes.

Whilst particular examples and embodiments have thus far been described, it will be understood that various modifications may be made without departing from the scope of the invention as defined by the claims.

The invention claimed is:

1. A buck-boost converter comprising:
input terminals for connection to a power supply supplying an alternating input voltage;
output terminals for outputting an output voltage;
a first group of devices and a second group of devices, each group of devices comprising: a first switch, a second switch, and a third switch or diode connected in series;
a first node located between the first switch and the second switch; and a second node located between the second switch and the third switch or diode;
an inductor;
a capacitor; and
a controller for controlling the switches of the first group of devices and the second group of devices,
wherein:
a first of the input terminals is connected to the first node of the first group of devices;
a second of the input terminals is connected to the first node of the second group of devices;
the inductor is connected between the second node of the first group of devices and the second node of the second group of devices;
the first group of devices, the second group of devices, and the capacitor are connected in parallel across the output terminals;
the first switch of each group of devices has an OFF state in which the switch is non-conductive in both directions;
the second switch of each group has an ON state in which the switch is conductive in both directions;
the third switch or diode of each group of devices provides a path for inductive current when charging the capacitor; and
the controller configures the switches in (i) a configuration in which the first switch of one group of devices is OFF, the first switch of the other group of devices is ON, and the second switches of both groups of devices are ON, thereby causing the inductor to be energized by the power supply, and (ii) a further configuration in which the first and the second switches of one group of devices are OFF, and the first and the second switches of the other group of devices are ON, thereby causing energy stored in the inductor to be transferred to the capacitor.

2. The converter as claimed in claim 1, wherein the controller switches the first switches at a lower frequency than that of the second switches.

3. The converter as claimed in claim 1, wherein the controller switches the first switches at a frequency of the input voltage.

4. The converter as claimed in claim 1, wherein the controller controls the switches such that the first switch of the first group of devices is OFF and the first switch of the second group of devices is ON when the polarity of the input voltage is positive, and the first switch of the first group of devices is ON and the first switch of the second group of devices is OFF when the polarity of the input voltage is negative.

5. The converter as claimed in claim 1, wherein the controller controls the switches such that the second switch of the second group of devices is ON and the second switch of the first group of devices is repeatedly switched when the polarity of the input voltage is positive, and the second switch of the first group of switches is ON and the second switch of the second group of switches is repeatedly switched when the polarity of the input voltage is negative.

6. The converter as claimed in claim 1, wherein the second switches and the third switches are the same type of switch.

7. The converter as claimed in claim 1, wherein the controller switches the first switches at a frequency less than 500 Hz, and the controller switches the second switches at a frequency greater than 10 KHz.

8. The converter as claimed in claim 1, wherein each of the first switches has an ON state in which the switch is conductive in both directions.

9. The converter as claimed in claim 1, wherein the controller configures the switches in a configuration in which the inductor is energized by the power supply, and a further configuration in which energy stored in the inductor is transferred to the capacitor.

10. The converter as claimed in claim 9, wherein (i) in the configuration the first switch of one group of devices is OFF, the first switch of the other group of devices is ON, and the second switches of both groups of devices are ON, and (ii) in the further configuration the first and second switches of one group of devices is OFF, and the first and second switches of the other group of devices is ON.

11. A buck-boost converter comprising:
input terminals for connection to a power supply supplying an alternating input voltage;
output terminals for outputting an output voltage;
a first group of devices and a second group of devices, each group of devices comprising: a first switch, a second switch, and a third switch or diode connected in series; a first node located between the first switch and the second switch; and a second node located between the second switch and the third switch or diode;
an inductor;
a capacitor; and
a controller for controlling the switches of the first group of devices and the second group of devices,
wherein:
a first of the input terminals is connected to the first node of the first group of devices;
a second of the input terminals is connected to the first node of the second group of devices;
the inductor is connected between the second node of the first group of devices and the second node of the second group of devices;
the first group of devices, the second group of devices, and the capacitor are connected in parallel across the output terminals; and
the controller configures the switches in (i) a configuration in which the first switch of one group of devices is OFF, the first switch of the other group of devices is ON, and the second switches of both groups of devices are ON, thereby causing the inductor to be energized by the power supply, and (ii) a further configuration in which the first and second switches of one group of devices are OFF, and the first and second switches of the other group of devices are ON, thereby causing energy stored in the inductor to be transferred to the capacitor.

* * * * *